(12) United States Patent
Sakal

(10) Patent No.: US 11,226,117 B2
(45) Date of Patent: Jan. 18, 2022

(54) FLEXIBLE FILTER CAGE FOR A MAKE-UP AIR MODULE

(71) Applicant: Haier US Appliance Solutions, Inc., Wilmington, DE (US)

(72) Inventor: Eric Ormsby Sakal, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 247 days.

(21) Appl. No.: 16/515,254

(22) Filed: Jul. 18, 2019

(65) Prior Publication Data

US 2021/0018187 A1 Jan. 21, 2021

(51) Int. Cl.
*B01D 46/00* (2006.01)
*B01D 46/10* (2006.01)
*F24F 1/027* (2019.01)
*F24F 1/035* (2019.01)

(52) U.S. Cl.
CPC ............ *F24F 1/035* (2019.02); *B01D 46/001* (2013.01); *B01D 46/0005* (2013.01); *B01D 46/10* (2013.01); *F24F 1/027* (2013.01); *B01D 2265/06* (2013.01); *B01D 2275/203* (2013.01); *B01D 2279/50* (2013.01)

(58) Field of Classification Search
CPC .............. B01D 46/001; B01D 46/0001; B01D 46/0005; B01D 46/10; B01D 46/0013; B01D 46/0036; B01D 46/521; B01D 53/75; B01D 2265/06; B01D 2275/203; B01D 2279/50; F24F 1/035; F24F 1/027; F24F 7/065; F24F 11/39; F24D 29/646

USPC ............. 55/481, 483, 484, 495, 501; 95/286
See application file for complete search history.

(56) References Cited

U.S. PATENT DOCUMENTS

| | | | |
|---|---|---|---|
| 6,099,612 A * | 8/2000 | Bartos ................ | B01D 46/0005 55/481 |
| 6,497,740 B1 | 12/2002 | Moretti | |
| 8,241,381 B2 * | 8/2012 | Braunecker ........ | B01D 46/0013 55/483 |
| 8,834,592 B1 * | 9/2014 | Dimicelli ........... | B01D 46/0036 55/484 |
| 8,834,611 B1 * | 9/2014 | Dimicelli ........... | B01D 46/0036 95/286 |
| 8,992,650 B2 | 3/2015 | Rahmathullah et al. | |
| 10,641,520 B2 * | 5/2020 | Conrad .................... | F24F 7/065 |
| 10,900,681 B2 * | 1/2021 | Longman ................. | F24F 11/39 |
| 2006/0037296 A1 * | 2/2006 | Duffy ................. | B01D 46/0001 55/495 |
| 2008/0034718 A1 * | 2/2008 | Schuld ................. | B01D 46/521 55/495 |
| 2008/0173178 A1 * | 7/2008 | Metteer .................. | B01D 53/75 95/286 |
| 2009/0142234 A1 * | 6/2009 | Tatarchuk ............ | B01D 46/521 422/122 |

(Continued)

*Primary Examiner* — Minh Chau T Pham
(74) *Attorney, Agent, or Firm* — Dority & Manning, P.A.

(57) ABSTRACT

A flexible filter cage for receiving an air filter in an air conditioner unit includes a first frame portion and a second frame portion spaced apart from the first frame portion to define a frame cavity therebetween. A flexible bridge extends between and flexibly connects the first frame portion and the second frame portion to permit flexing of the filter cage up to a predetermined angle which facilitates easy mounting into a filter slot defined by the air conditioner unit.

18 Claims, 10 Drawing Sheets

(56) References Cited

U.S. PATENT DOCUMENTS

| | | | | |
|---|---|---|---|---|
| 2014/0215981 A1* | 8/2014 | Pfannenberg | ......... | F04D 29/646 55/501 |
| 2018/0272263 A1 | 9/2018 | Gregerson et al. | | |
| 2018/0347835 A1 | 12/2018 | Chapin et al. | | |
| 2019/0145655 A1* | 5/2019 | Conrad | .............. | B01D 46/0005 165/119 |

* cited by examiner

FLEXIBLE FILTER CAGE FOR A MAKE-UP AIR MODULE

FIELD OF THE INVENTION

The present disclosure relates generally to air conditioner units, and more particularly to filter assemblies and filter cages for make-up air modules in packaged terminal air conditioner units.

BACKGROUND OF THE INVENTION

Air conditioner or conditioning units are conventionally utilized to adjust the temperature indoors—i.e. within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected, by e.g., tubing carrying the refrigerant, to another portion located outdoors. These types of units are typically used for conditioning the air in larger spaces.

Another type of unit, sometimes referred to as a packaged terminal air conditioner unit (PTAC), may be used for somewhat smaller indoor spaces that are to be air conditioned. These units may include both an indoor portion and an outdoor portion separated by a bulkhead and may be installed in windows or positioned within an opening of an exterior wall of a building. PTACs often need to draw air from the outdoor portion into the indoor portion. Accordingly, certain PTACs allow for the introduction of make-up air into the indoor space, e.g., through a vent aperture defined in the bulkhead that separates the indoor and outdoor side of the unit. The vent aperture is usually equipped with an auxiliary fan and/or make-up air module to urge a flow of make-up air from the outdoor side of the PTAC into the conditioned room.

Notably, it is frequently desirable to filter the flow of make-up air entering the room through the vent aperture. However, conventional air filters are typically located in difficult to reach locations or areas with very poor accessibility and clearance, resulting in a constrained operating area and difficult installation of the filter housing and air filter. For example, for certain conventional PTACs, a rigid filter housing may be screwed or otherwise fixed or mechanically fastened to a front faceplate of the makeup air module, e.g., on an outdoor facing portion of the unit. Properly positioning the filter housing, installing the mechanical fasteners, and replacing air filters in these units may be a very difficult and time-consuming process.

Accordingly, improved air conditioner units having improved filter assemblies would be useful. More specifically, a filter cage or housing that facilies quick and easy replacement of an air filter in a packaged terminal air conditioner unit would be particularly beneficial.

BRIEF DESCRIPTION OF THE INVENTION

Aspects and advantages of the invention will be set forth in part in the following description, or may be obvious from the description, or may be learned through practice of the invention.

In accordance with one embodiment, a packaged terminal air conditioner unit defining a vertical direction, a lateral direction, and a transverse direction is provided. The packaged terminal air conditioner unit includes a bulkhead defining an indoor portion and an outdoor portion, a vent aperture defined in the bulkhead, and an auxiliary fan positioned proximate the vent aperture and being configured for urging a flow of make-up air from the outdoor portion through the vent aperture to the indoor portion. A filter cage is positioned adjacent the auxiliary fan and is configured for receiving an air filter. The filter cage includes a first frame portion, a second frame portion spaced apart from the first frame portion to define a frame cavity therebetween, and a flexible bridge extending between and flexibly connecting the first frame portion and the second frame portion.

In accordance with another embodiment, a filter assembly for a make-up air module is provided. The filter assembly includes a filter cage including a first frame portion, a second frame portion spaced apart from the first frame portion to define a frame cavity therebetween, and a flexible bridge extending between and flexibly connecting the first frame portion and the second frame portion. An air filter is positionable within the filter cavity for filtering a flow of make-up air passing through the make-up air module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
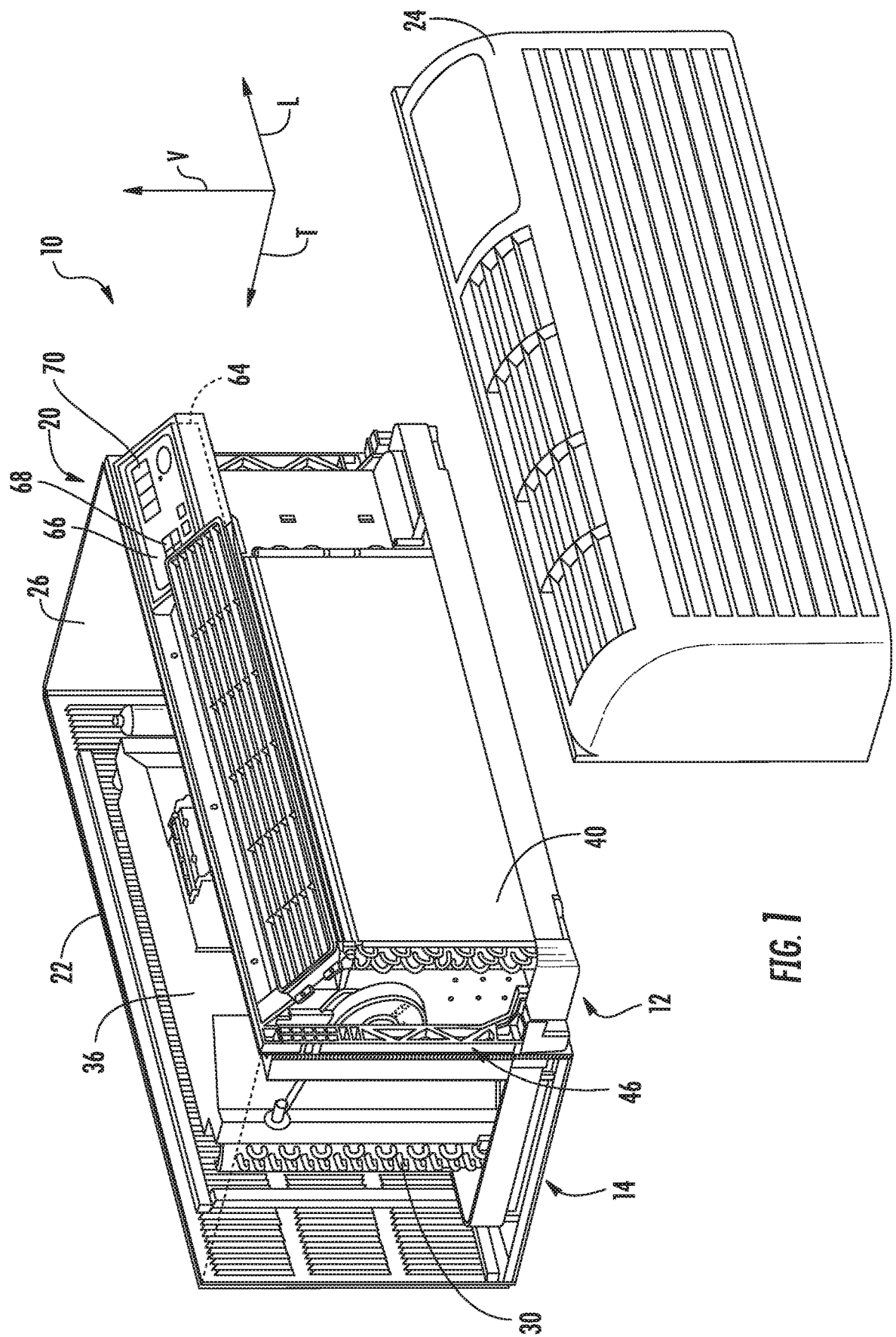
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. In addition, terms of approximation, such as "approximately," "substantially," or "about," refer to being within a ten percent margin of error.

Referring now to FIG. 1, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32 (FIG. 2), and a compressor 34 (FIG. 2) may be housed within the wall sleeve 26. A casing 36 may additionally enclose outdoor fan 32, as shown.

Figure 2:
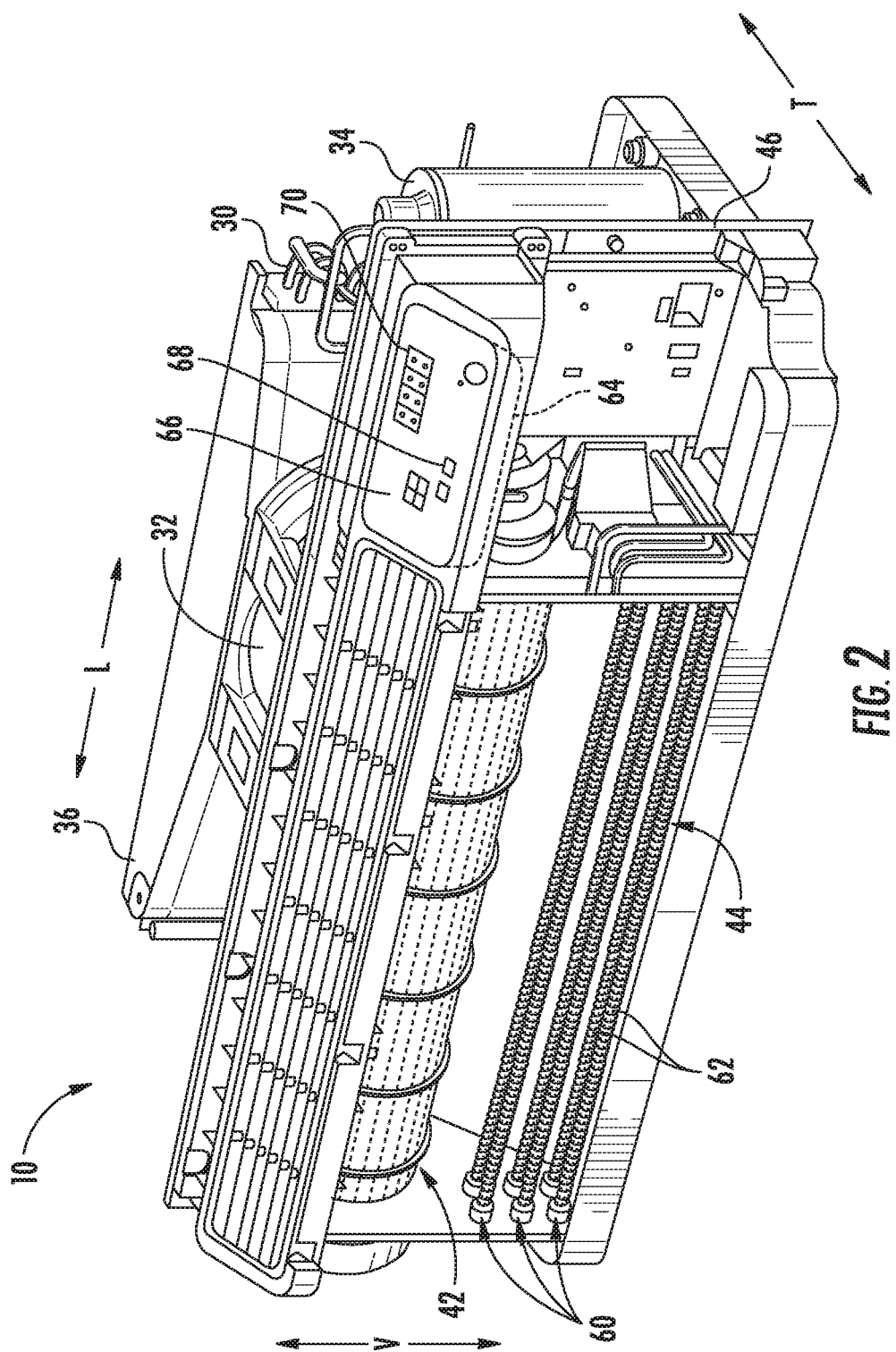
FIG. 2 is another perspective view of components of the indoor portion of the exemplary air conditioner unit of FIG. 1.

Referring now also to FIG. 2, indoor portion 12 may include, for example, an indoor heat exchanger 40 (FIG. 1), a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
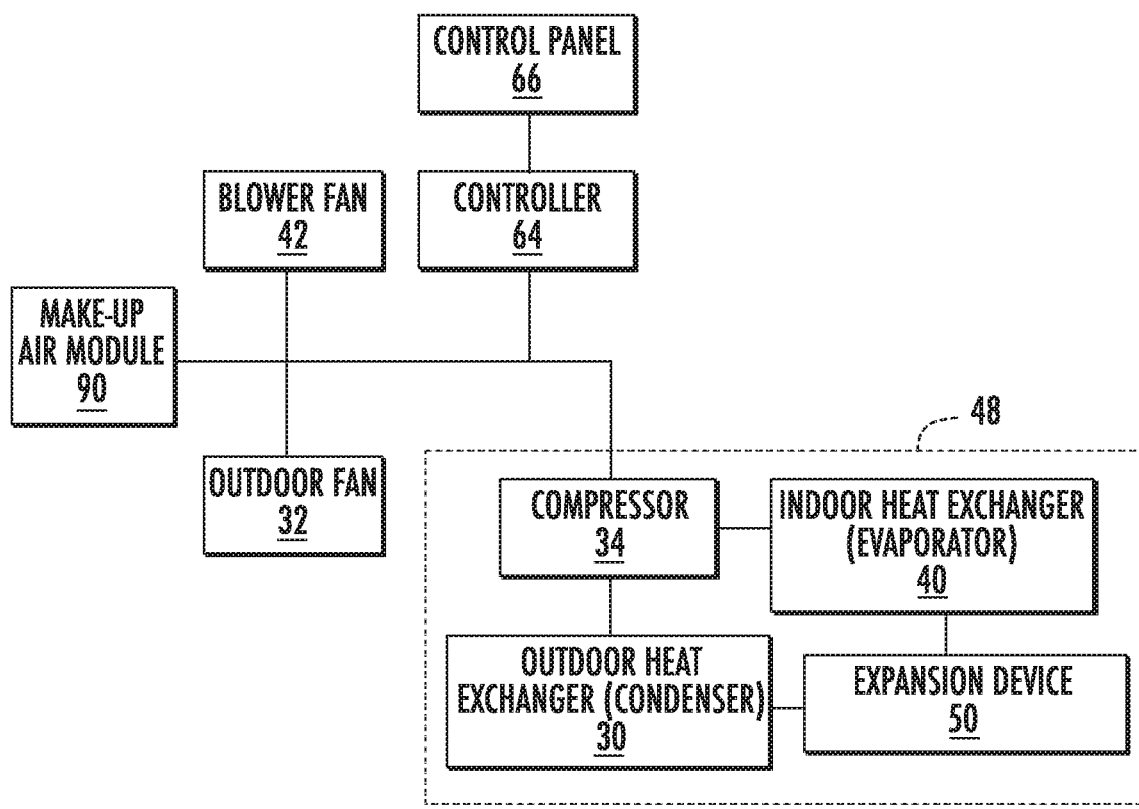
FIG. 3 is a schematic view of a refrigeration loop in accordance with one embodiment of the present disclosure.

Outdoor and indoor heat exchangers 30, 40 may be components of a refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such example and rather that any suitable refrigerant may be utilized.

As is understood in the art, refrigeration loop 48 may be alternately be operated as a refrigeration assembly (and thus perform a refrigeration cycle) or a heat pump (and thus perform a heat pump cycle). As shown in FIG. 3, when refrigeration loop 48 is operating in a cooling mode and thus performs a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air, and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. According to exemplary embodiments, controller 64 may include a memory and one or more processing devices such as microprocessors, CPUs or the like, such as general or special purpose microprocessors operable to execute programming instructions or microcontrol code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66, and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
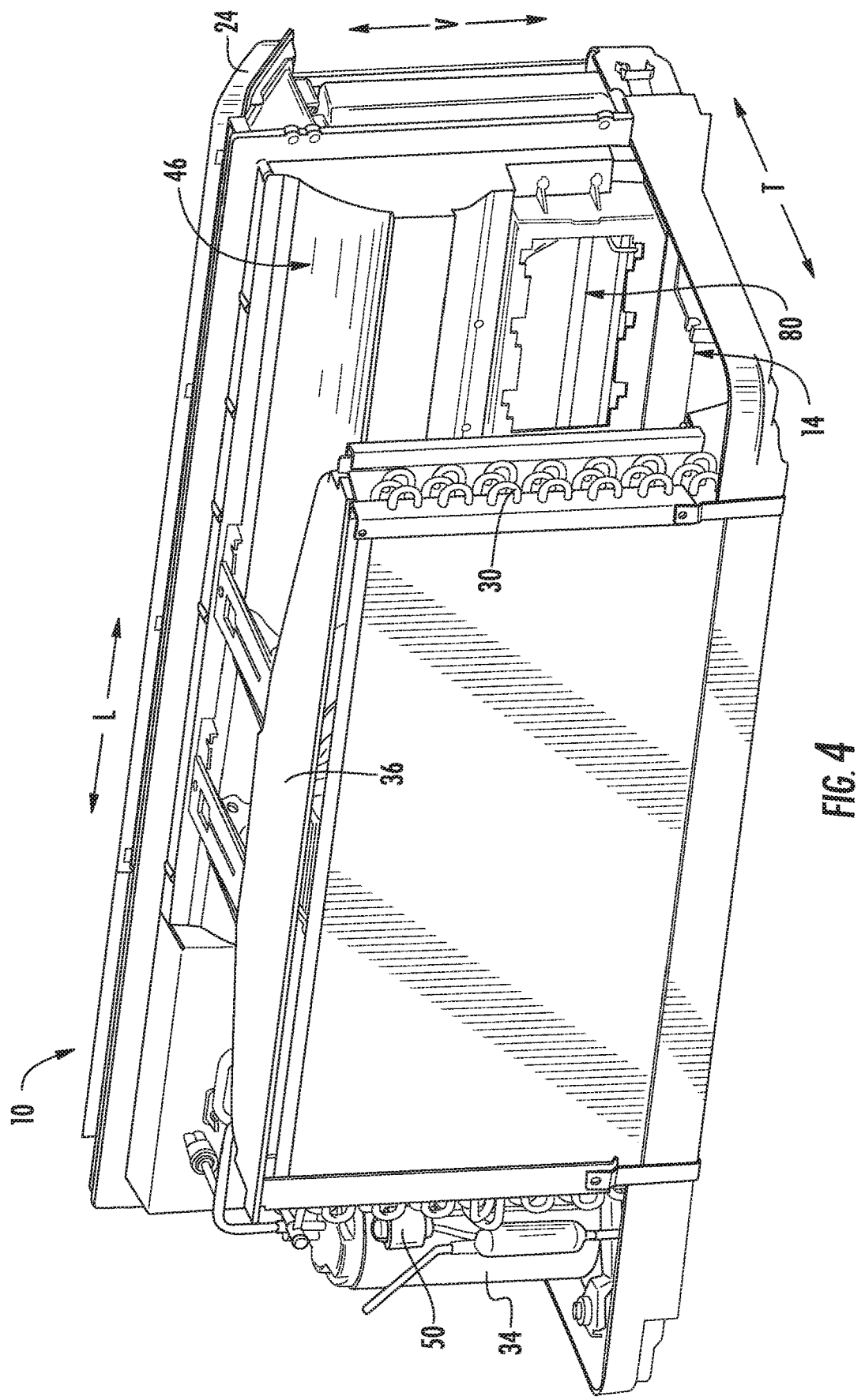
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, or to compensate for negative pressure created within the room. In this manner, according to an exemplary embodiment, make-up air may be provided into the room through vent aperture 80 when desired.

Figure 5:
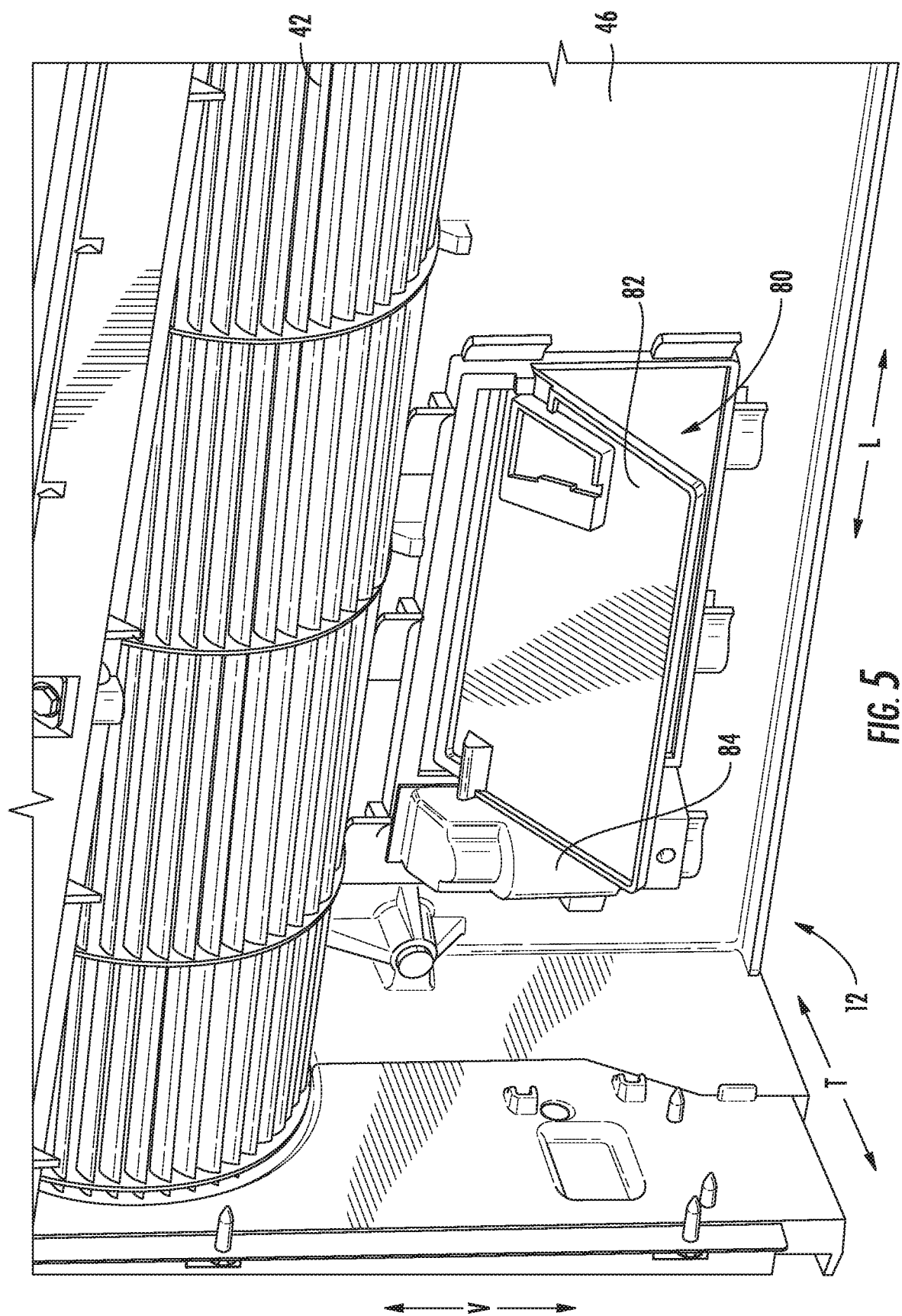
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

Figure 6:
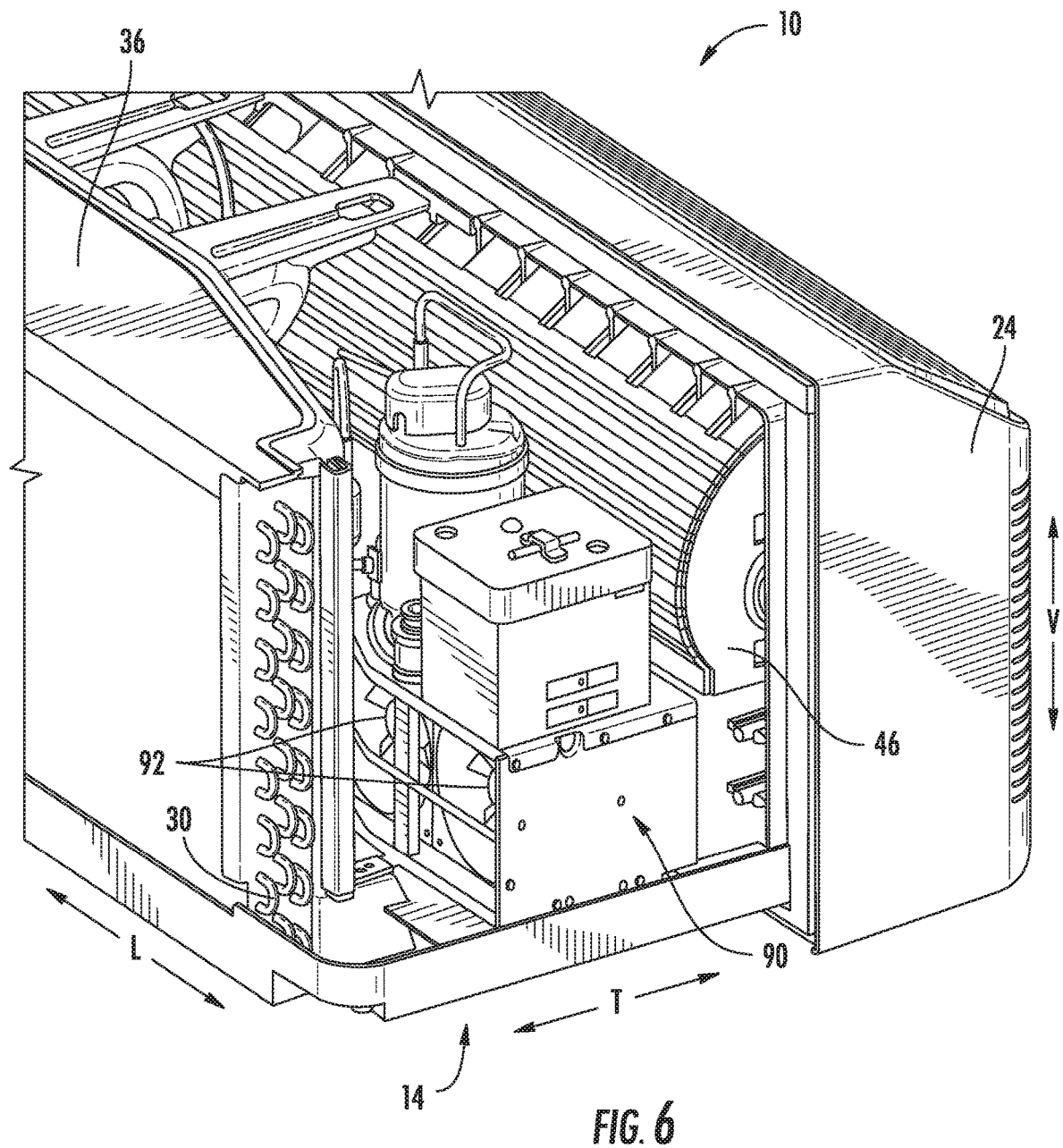
FIG. 6 is a rear perspective view of the exemplary air conditioner unit and bulkhead of FIG. 4 including a make-up air module including a sealed system for conditioning make-up air in accordance with one embodiment of the present disclosure.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, as illustrated in FIG. 6, unit 10 may further include an auxiliary sealed system, or make-up air module 90, for conditioning make-up air. As shown, make-up air module 90 and/or an auxiliary fan 92 are positioned within outdoor portion 14 adjacent vent aperture 80 and vent door 82 is positioned within indoor portion 12 over vent aperture 80, though other configurations are possible. According to the illustrated embodiment auxiliary sealed system 90 may be controlled by controller 64, by another dedicated controller, or by any other suitable method.

As illustrated, make-up air module 90 includes auxiliary fan 92 that is configured as part of auxiliary sealed system 90 and may be configured for urging a flow of air through auxiliary sealed system 90. Auxiliary sealed system 90 may further include one or more compressors, heat exchangers, and any other components suitable for operating auxiliary sealed system 90 similar to refrigeration loop 48 described above to condition make-up air. For example, auxiliary system 90 can be operated in a dehumidification mode, an air conditioning mode, a heating mode, a fan only mode where only auxiliary fan 92 is operated to supply outdoor air, an idle mode, etc.

Referring now generally to FIGS. 7 through 13, a filter assembly 100 which may be used to filter a flow of makeup air (e.g., as identified by reference numeral 102 in FIGS. 12 and 13) will be described according to exemplary embodiments of the present subject matter. Filter assembly 100 is generally designed to facilitate a quick and easy installation or replacement of an air filter 104 (see FIG. 9). Although filter assembly 100 is described herein as being used with makeup air module 90 of packaged terminal air conditioner unit 10, it should be appreciated that according to alternative embodiments, filter assembly 100 may be used for mounting an air filter on any suitable air moving device, air conditioning system, fan system, etc.

Figure 7:
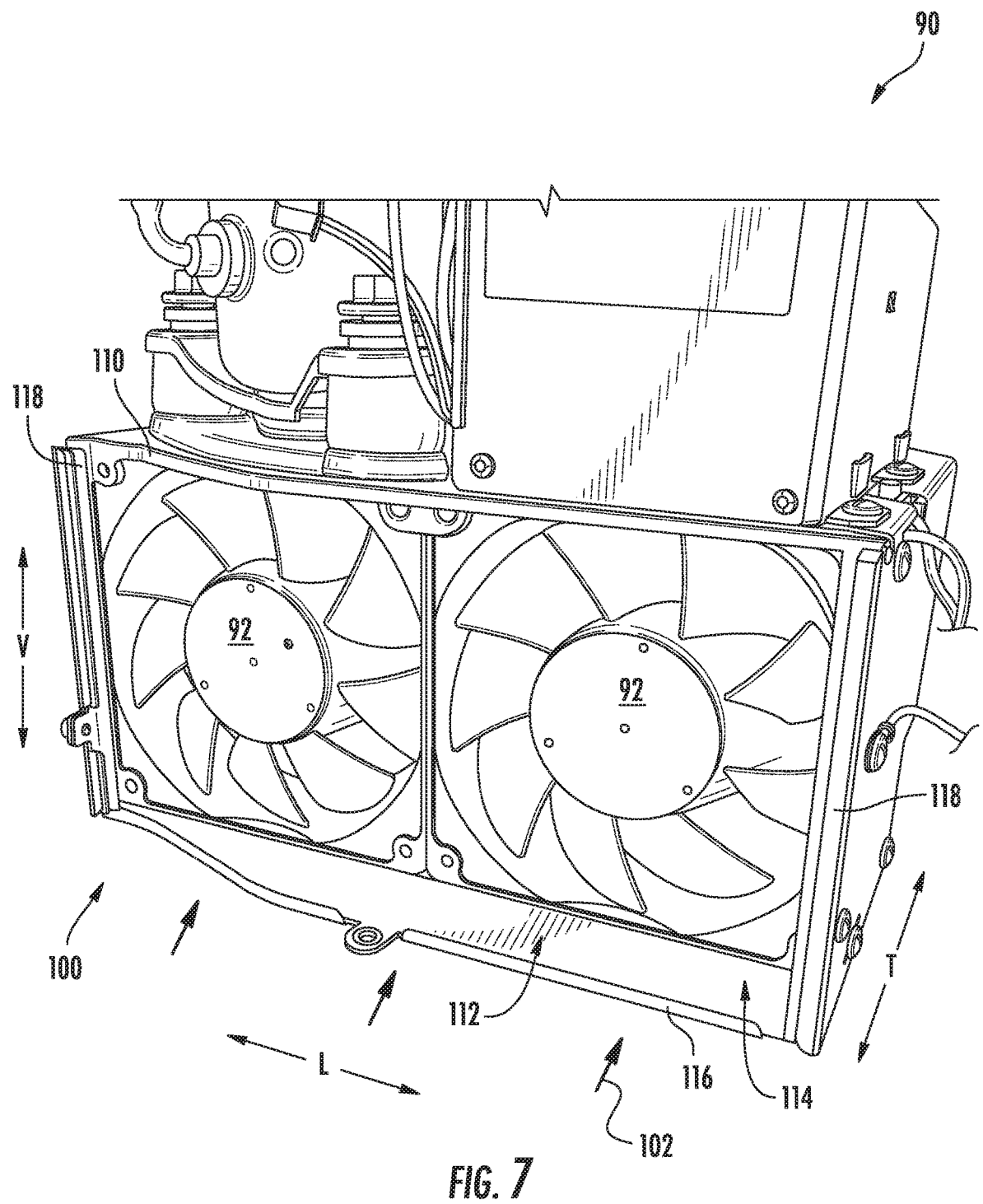
FIG. 7 is a perspective view of a fan assembly of the exemplary make-up air module of FIG. 6 according to an exemplary embodiment of the present subject matter.
Figure 8:
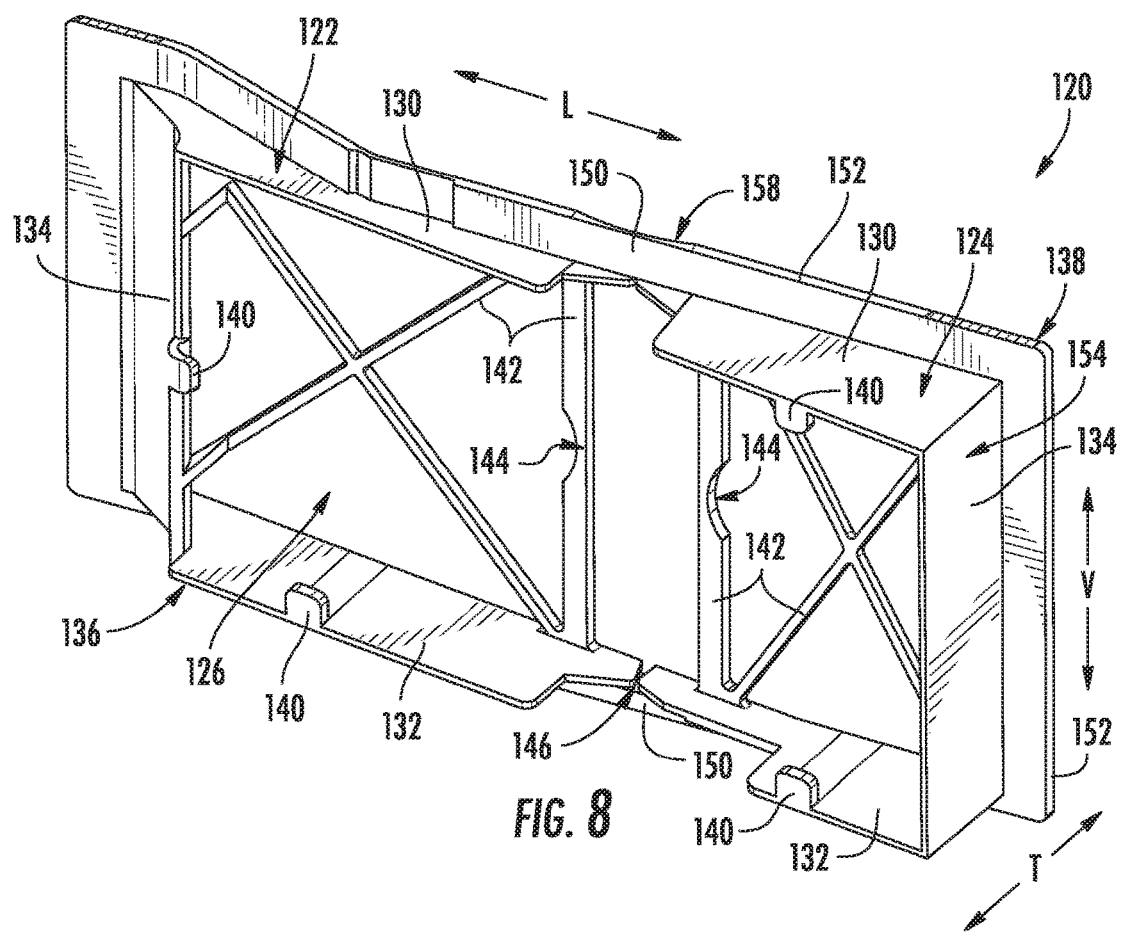
FIG. 8 is a perspective view of a filter cage for housing an air filter of the exemplary make-up air module of FIG. 6 according to an exemplary embodiment of the present subject matter.
Figure 9:
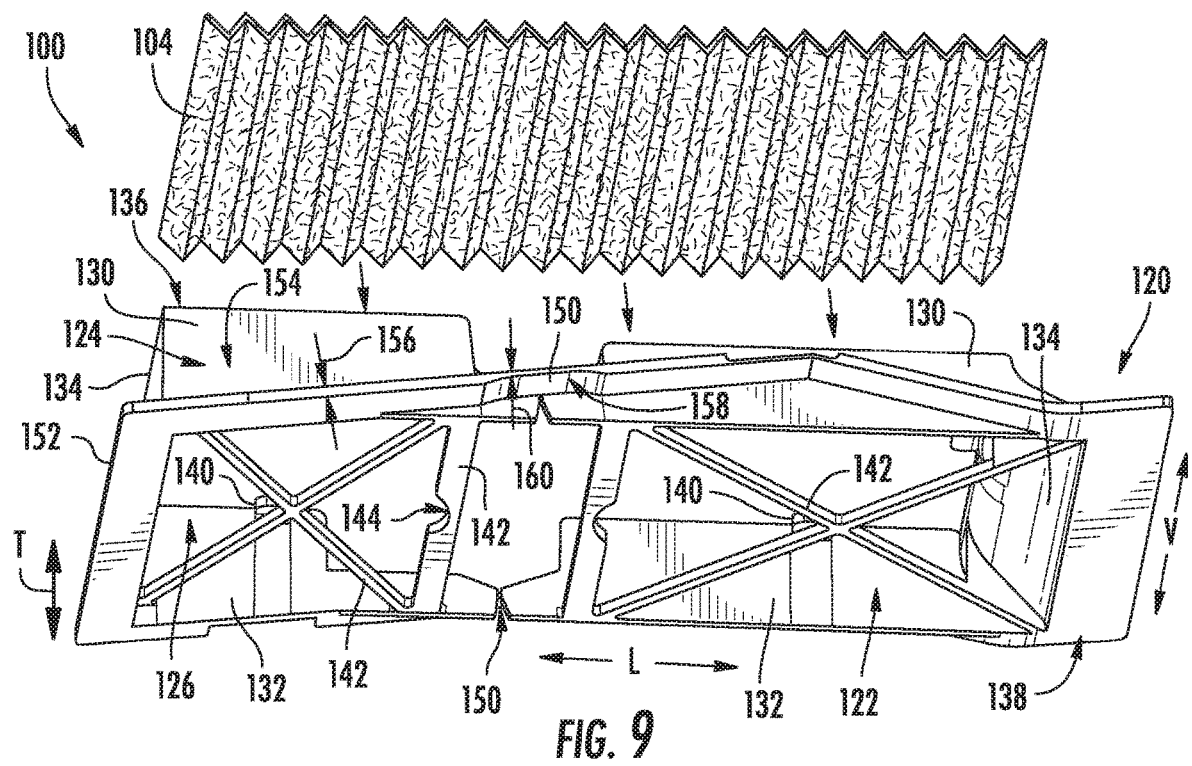
FIG. 9 is another perspective view of the exemplary filter cage of FIG. 8.

As illustrated, filter assembly 100 may include a receiving structure or mounting features defined on makeup air module 90, auxiliary fan 92, etc. Specifically, as illustrated, the fan housing 110 of auxiliary fan 92 may define a receiving slot 112 that is positioned upstream of auxiliary fan 92. Specifically, as best shown in FIG. 7, receiving slot 112 may be defined by an extended portion 114 of fan housing 110, e.g., a structure which extends upstream of and away from auxiliary fan 92 to a distal end. At the distal end of extended portion 114, a raised lateral flange 116 extends toward a center of the receiving slot 112, e.g., substantially along the vertical direction V. In this regard, raised lateral flange 116 may extend upward from a bottom, distal end of extended portion 114 of fan housing 110. In addition, housing 110 may define one or more raised vertical flanges 118 that extend toward the center of receiving slot 112 along the sides of receiving slot 112. In this regard, according to the illustrated embodiment, raised flanges 116, 118 surround receiving slot 112 on three sides, though alternative embodiments may use more or flanges.

Filter assembly 100 may further include a filter cage 120 which is generally configured for receipt within receiving slot 112. In addition, filter cage 120 is designed to receive air filter 104 for filtering the flow of makeup air 102 during operation of makeup air module 90. Notably, as described below, filter cage 120 is designed and constructed to be flexible for quick and easy installation into receiving slot 112 of fan housing 110. However, it should be appreciated that the way filter cage 120 is described as being received within fan housing 110 is only one exemplary application of the present subject matter. Variations and modifications may be made to fan housing 110, filter cage 120, or other components of packaged terminal air conditioner unit 10 while remaining within the scope of the present subject matter.

According to exemplary embodiments, filter cage 120 may be formed from any material which is sufficiently rigid to support air filter 104 during operation of packaged terminal air conditioner unit 10. For example, filter cage 120 may be formed by injection molding, e.g., using a suitable plastic material, such as polypropylene, injection molding grade high impact polystyrene (HIPS), or acrylonitrile butadiene styrene (ABS). Alternatively, according to the exemplary embodiment, these components may be compression molded, e.g., using sheet molding compound (SMC) thermoset plastic or other thermoplastics. According still other embodiments, filter cage 120 may be formed from metal or any other suitable rigid material, such as sheet metal.

As shown, filter cage 120 generally includes a first frame portion 122 and a second frame portion 124 which are spaced apart from each other to define a frame cavity 126 therebetween. In this regard, according to the illustrated embodiment, first frame portion 122 includes an upper member 130 and a lower member 132, which each extend substantially within a plane defined by the lateral direction L and transverse direction T. In addition, first frame portion 122 includes a vertical member 134 that extends between upper member 130 to lower member 132, e.g., to form a substantially U-shape. Each of the members 130-134 of filter cage 120 may generally extend between an upstream or forward end 136 and a downstream or aft end 138 of filter cage 120 along the transverse direction T.

According to an exemplary embodiment, aft end 138 of filter cage 120 is in contact with or pressed against a forward end of auxiliary fan 92 housings. According to one exemplary embodiment, vertical member 134 may be a substantially flat member that extends within a plane defined by the vertical direction V and the transverse direction T. However, according to the illustrated embodiment, vertical member 134 may be angled slightly relative to the transverse direction T such that an end of air filter 104 may slide between vertical member 134 and aft end 138 of filter cage 120 to secure it in place and prevent it from falling forward out of filter cage 120.

According to exemplary embodiments, second frame portion 124 may be substantially the same or similar to first frame portion 122. Due to the similarity between first frame portion 122 and second frame portion 124, similar reference numerals will be used to refer to the various pieces of such frame portions. In this regard, second frame portion 124 may similarly include an upper member 130, a lower member 132, and a vertical member 134. According to the illustrated embodiment, second frame portion 124 may be slightly shorter than first frame portion 122 along the lateral direction L. In addition, vertical member 134 is illustrated as extending substantially within the plane defined along the vertical direction V and transverse direction T (e.g., instead of being angled as described above). In this manner, during installation of air filter 104, the filter may slide into the tapered or angled vertical member 134 defined within first frame portion 122 and may sit flush against vertical member 134 of second frame portion 124.

Filter cage 120 may define additional features for retaining air filter 104 after installation. For example, filter cage 120 may define one or more retention members 140 which extend from forward end 138 inward toward frame cavity 126. In addition, each of first frame portion 122 and second frame portion 124 may define cross supports 142 that extend within a plane orthogonal to the transverse direction T proximate aft end 138 of filter cage 120. For example, as illustrated, cross supports 142 are thin members that extend within a plane defined by the vertical direction V and lateral direction L. In addition, according to the illustrated embodiment, filter cage 120 may define one or more finger grip recesses 144 within cross supports 142. In this manner, a user may squeeze cross supports 142 using finger grip recesses 144 to flex filter cage 120 and to facilitate easy installation into receiving slot 112.

According to the illustrated embodiment, first frame portion 122 and second frame portion 124 are spaced apart along the lateral direction L by a gap 146 that is sufficient to permit movement between first frame portion 122 and second frame portion 124. According to exemplary embodiments, gap 146 may be greater than about 0.1 millimeters, greater than about 2 millimeters, greater than about 5 millimeters, or greater than about 10 millimeters. In addition, or alternatively, gap 146 may be less than about 20 millimeters, less than about 15 millimeters, less than about 10 millimeters, or less than about 5 millimeters. Other sizes of gap 146 are possible and within the scope of the present subject matter.

As illustrated in the figures, filter cage 120 may further include a flexible bridge 150 that extends between and flexibly connects first frame portion 122 and second frame portion 124. In general, flexible bridge 150 may be any mechanical connection between the first frame portion 122 and second frame portion 124 that permits flexing therebetween. For example, according to exemplary embodiments, flexible bridge 150 may be a mechanical hinge or joint that is positioned between first frame portion 122 and second frame portion 124. According to still other embodiments, flexible bridge 150 may be a weakened or tapered portion defined between first frame portion 122 and second frame portion 124. Other configurations are possible and within scope of the present subject matter.

As best illustrated in FIGS. 8 through 11, filter cage 120 may further include an elongated flange 152 that extends from an outer surface 154 of both first frame portion 122 and second frame portion 124. In this regard, elongated flange 152 extends away from frame cavity 126 and is configured for engaging receiving slot 112 to secure filter cage 120 in place after installation. In addition, elongated flange 152 may provide rigidity to filter cage 120 at the desired locations. As shown, elongated flange 152 defines a nominal thickness 156 is sufficient for providing rigidity to filter cage 120. In addition, as illustrated, flexible bridge 150 is a tapered portion 158 of elongated flange 152. In this regard, tapered portion 158 may define a tapered thickness 160 which may be smaller than the nominal thickness 156. Specifically, according to exemplary embodiments, tapered thickness 160 may be less than three quarters, less than half, less than one quarter, or less, than nominal thickness 156.

Figure 10:
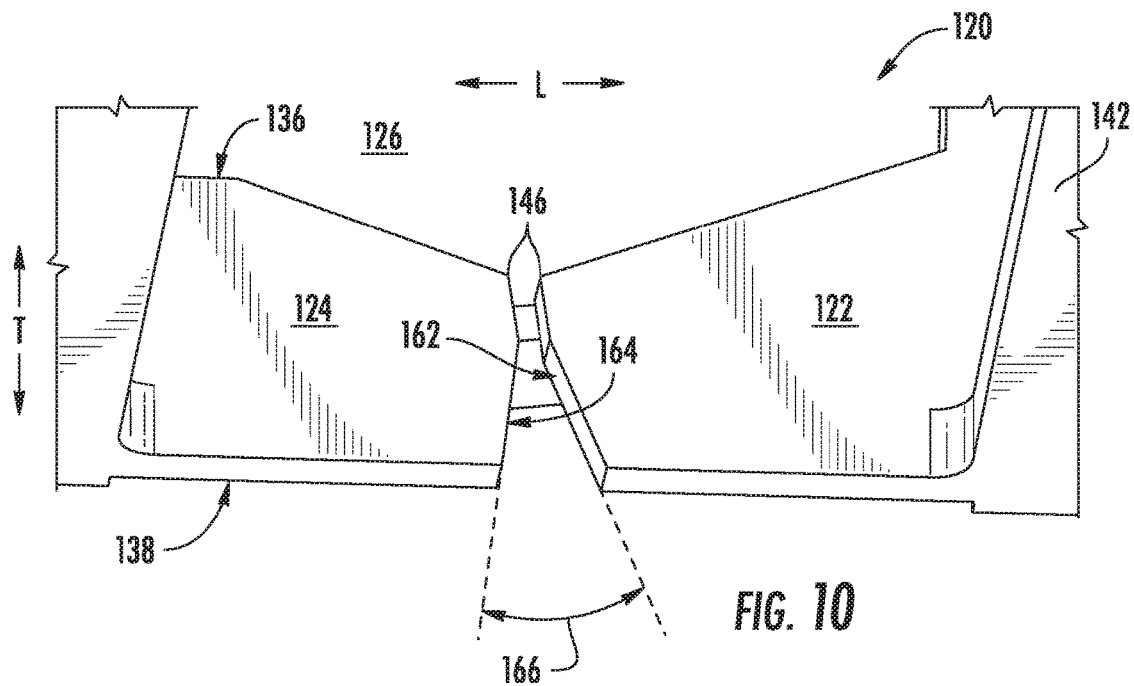
FIG. 10 is a close-up perspective view of a flexible joint or bridge of the exemplary filter cage of FIG. 8.

Referring now specifically to FIG. 10, first frame portion 122 of filter cage 120 may define a first blocking face 162 and second frame portion 122 of filter cage 120 may define a second blocking face 164. In general, first blocking face 162 and second blocking face 164 may be any suitable features defined on filter cage 120 which prevent flexing of filter cage 120 beyond a predetermined angle. Specifically, according to the illustrated embodiment, first blocking face 162 and second blocking face 164 to define a flex angle 166 when filter cage 120 is in the relaxed position. For example, flex angle 166 may be between about 2 degrees and 45 degrees, between about 5 and 30 degrees, between about 10 and 20 degrees, or about 15 degrees.

Figure 11:
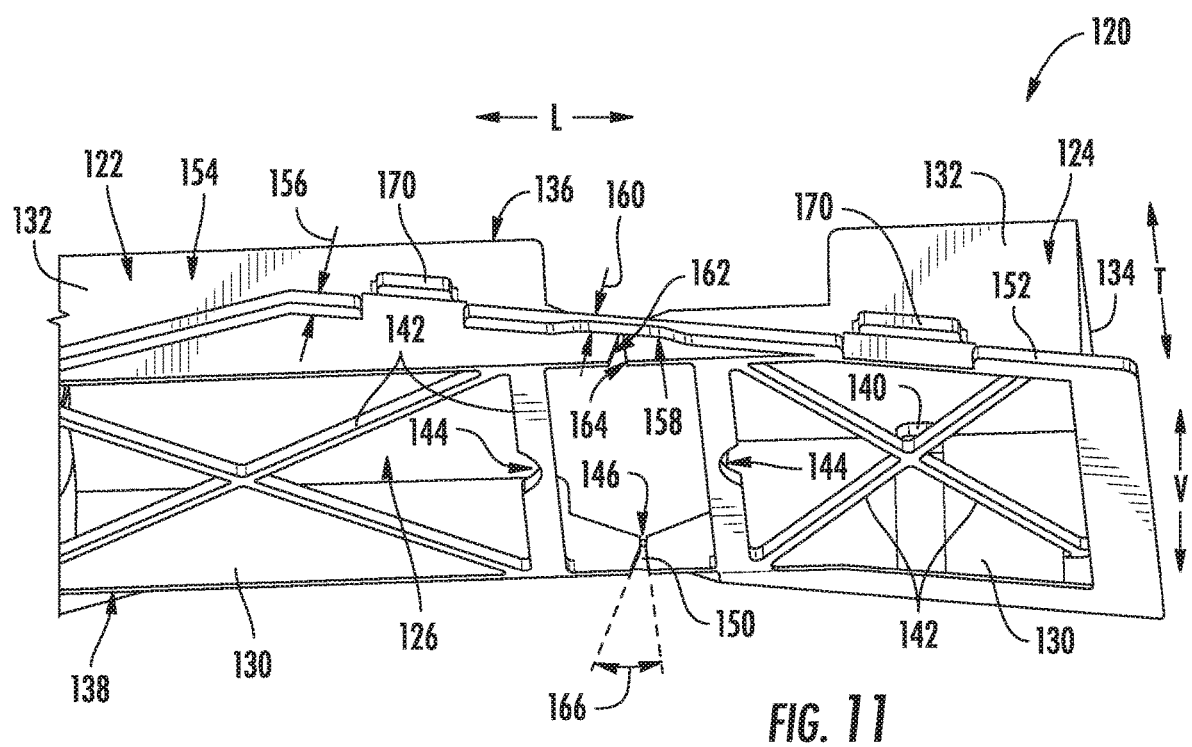
FIG. 11 is another perspective view of the exemplary filter cage of FIG. 8.
Figure 12:
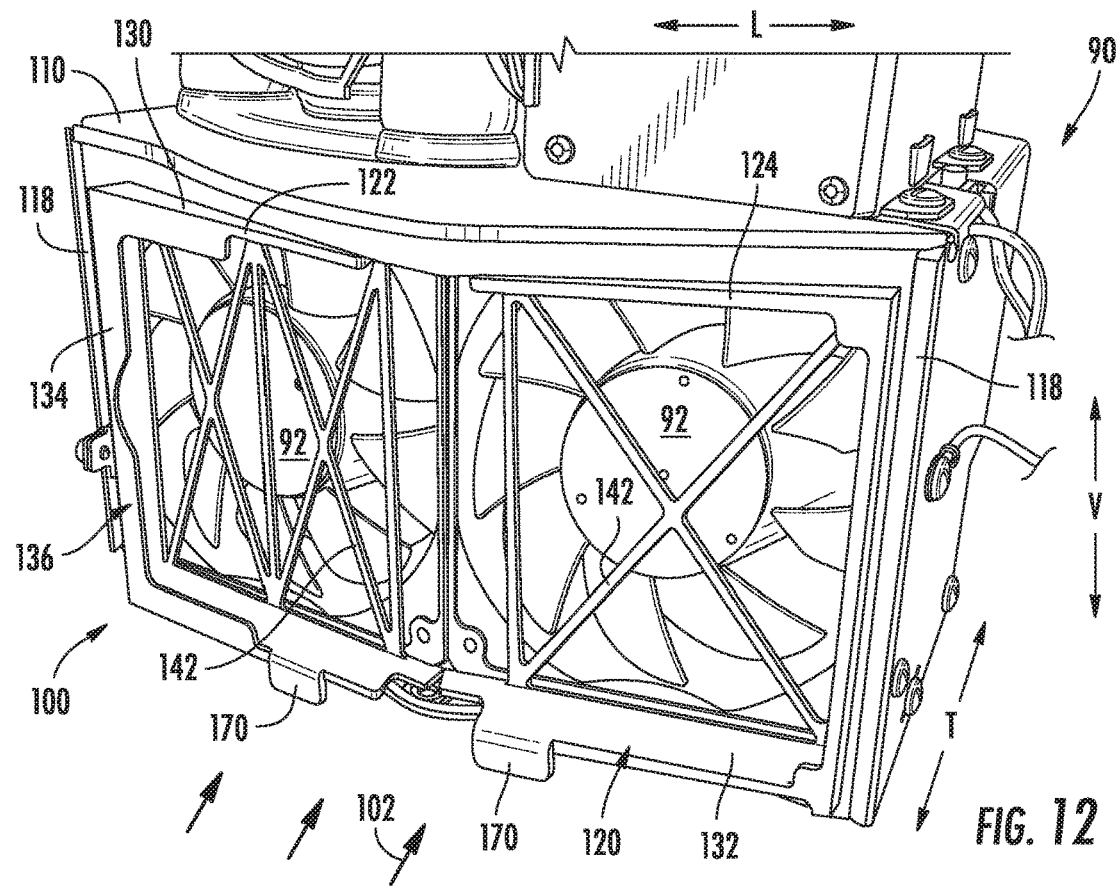
FIG. 12 is a perspective view of an exemplary filter cage being installed on the exemplary make-up air module of FIG. 6.
Figure 13:
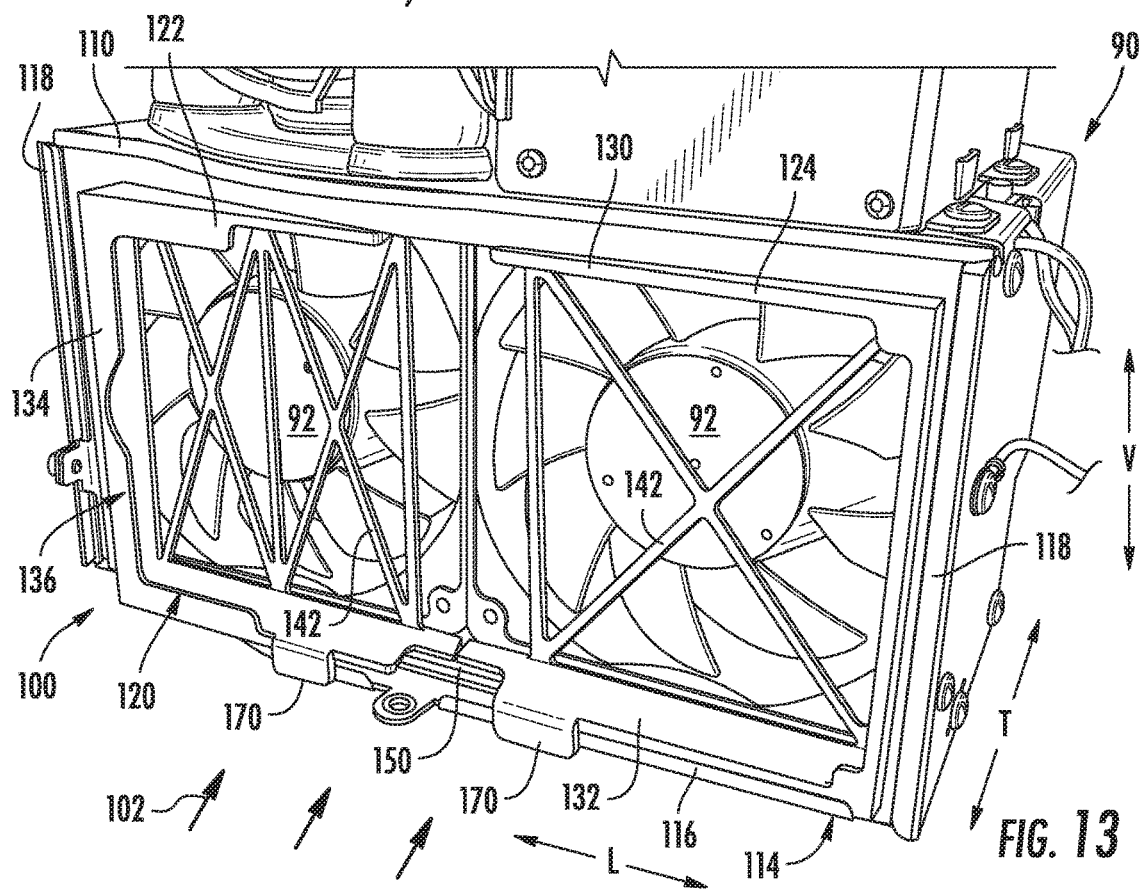
FIG. 13 is a perspective view of the exemplary filter cage of FIG. 12 after installation on the exemplary make-up air module of FIG. 6.

As best shown in FIG. 11, filter cage 120 may further include a locking rib 170 that is spaced apart from elongated flange 152 along the transverse direction T. Specifically, locking rib 170 is defined on a bottom of filter cage 120, e.g., on an outer surface 154 of lower members 132. Notably, locking rib 170 may be spaced apart from elongated flange 152 by a distance substantially equivalent to a thickness of raised lateral flange 116. In this manner, filter cage 120 may be secured in place when elongated flange 152 and locking rib 170 straddle raised lateral flange 116. Thus, when properly installed, raised lateral flange 116 is seated or squeezed between elongated flange 152 and locking rib 170 to prevent further flexing of filter cage 120, thereby locking filter cage 120 in the relaxed position.

In this manner, filter assembly 100 may be simply and easily installed into receiving slot 112 of makeup air module 90. Specifically, filter cage 120 may be installed by squeezing on finger grip recesses 144 to flex filter cage 120 at flexible bridge 150 up to flex angle 166. When filter cage 120 is flexed in this manner, the lateral dimension or width of filter cage 120 is minimized such that a left end of filter cage 120 (e.g. vertical member 134 of the first frame portion 122) may slide from right to left into receiving slot 112. The user may then release filter cage 120 such that the natural resiliency of flexible bridge 150 springs filter cage 120 back into a relaxed position. In this position, an aft and 138 of filter cage 120 sits flush with a forward face of auxiliary fan 92. After filter cage 120 is in place, air filter 104 may slide into filter cage 120 and be retained by retention members 140. Notably, the entire installation process of filter assembly 100 may be completed without the use of tools and within the constrained space available within packaged terminal air conditioner unit 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A packaged terminal air conditioner unit defining a vertical direction, a lateral direction, and a transverse direction, the packaged terminal air conditioner unit, comprising:
   a bulkhead defining an indoor portion and an outdoor portion;
   a vent aperture defined in the bulkhead;
   an auxiliary fan positioned proximate the vent aperture and being configured for urging a flow of make-up air from the outdoor portion through the vent aperture to the indoor portion; and
   a filter cage positioned adjacent the auxiliary fan and being configured for receiving an air filter, the filter cage comprising:
      a first frame portion;
      a second frame portion spaced apart from the first frame portion to define a frame cavity therebetween, wherein the first frame portion and the second frame portion are spaced apart along the lateral direction by a gap; and
      a flexible bridge extending between and flexibly and permanently connecting the first frame portion and the second frame portion, wherein the first frame portion defines a first blocking face proximate the flexible bridge and the second frame portion defines a second blocking face proximate the flexible bridge, the first blocking face configured for engaging the second blocking face to limit the flexing of the filter cage.

2. The packaged terminal air conditioner unit of claim 1, wherein the filter cage comprises an elongated flange that extends from an outer surface of the first frame portion and the second frame portion away from the frame cavity.

3. The packaged terminal air conditioner unit of claim 2, wherein the flexible bridge is a tapered portion of the elongated flange that extends between and connects the first frame portion and the second frame portion.

4. The packaged terminal air conditioner unit of claim 1, wherein a flex angle is defined between the first blocking face and the second blocking face when the filter cage is in a relaxed position.

5. The packaged terminal air conditioner unit of claim 4, wherein the flex angle is between about 10 degrees and 30 degrees.

6. The packaged terminal air conditioner unit of claim 1, further comprising:
   a receiving slot positioned upstream of the auxiliary fan for receiving the filter cage.

7. The packaged terminal air conditioner unit of claim 6, wherein the receiving slot is defined in part by a raised lateral flange, and wherein the filter cage further comprises:

an elongated flange that extends from an outer surface of the first frame portion and the second frame portion away from the frame cavity; and a locking rib spaced apart from the elongated flange along the transverse direction, wherein the filter cage is secured in place when the elongated flange and the locking rib straddle the raised lateral flange.

8. The packaged terminal air conditioner unit of claim 1, wherein the filter cage further comprises cross supports extending within a plane orthogonal to the transverse direction proximate an aft end of the first frame portion and the second frame portion.

9. The packaged terminal air conditioner unit of claim 8, wherein the filter cage defines one or more finger grip recesses on the cross supports.

10. The packaged terminal air conditioner unit of claim 1, wherein the filter cavity is configured for receiving the air filter after the filter cage is installed.

11. The packaged terminal air conditioner unit of claim 1, wherein the filter cage is injection molded as a single, integral piece.

12. The packaged terminal air conditioner unit of claim 1, wherein the filter cage is made from polypropylene.

13. The packaged terminal air conditioner unit of claim 1, wherein the auxiliary fan is part of a make-up air module, the make-up air module further comprising:

an auxiliary sealed system positioned downstream of the auxiliary fan for conditioning the flow of make-up air.

14. A filter assembly for a make-up air module, the filter assembly comprising:

a filter cage comprising a first frame portion, a second frame portion spaced apart from the first frame portion to define a frame cavity therebetween, wherein the first frame portion and the second frame portion are spaced apart along the lateral direction by a gap, and a flexible bridge extending between and flexibly and permanently connecting the first frame portion and the second frame portion, wherein the first frame portion defines a first blocking face proximate the flexible bridge and the second frame portion defines a second blocking face proximate the flexible bridge, the first blocking face configured for engaging the second blocking face to limit the flexing of the filter cage; and an air filter positionable within the filter cavity for filtering a flow of make-up air passing through the make-up air module.

15. The filter assembly of claim 14, wherein the filter cage comprises an elongated flange that extends from an outer surface of the first frame portion and the second frame portion away from the frame cavity, and wherein the flexible bridge is a tapered portion of the elongated flange that extends between and connects the first frame portion and the second frame portion.

16. The filter assembly of claim 14, wherein a predetermined flex angle is defined between the first blocking face and the second blocking face when the filter cage is in a relaxed position.

17. The filter assembly of claim 14, wherein the filter cage further comprises:

an elongated flange that extends from an outer surface of the first frame portion and the second frame portion away from the frame cavity; and a locking rib spaced apart from the elongated flange along the transverse direction, wherein the filter cage is secured in place when the elongated flange and the locking rib straddle a raised lateral flange defined on the make-up air module.

18. The filter assembly of claim 14, wherein the filter cage is injection molded as a single, integral piece of polypropylene.

* * * * *